United States Patent
Brunsman et al.

(10) Patent No.: US 11,323,492 B2
(45) Date of Patent: *May 3, 2022

(54) MANAGING DATA COMMUNICATIONS BASED ON PHONE CALLS BETWEEN MOBILE COMPUTING DEVICES

(71) Applicant: Google LLC, Mountain View, CA (US)

(72) Inventors: Lawrence Jonathan Brunsman, Mountain View, CA (US); Christian Sonntag, San Francisco, CA (US); Emil Valkov, San Rafael, CA (US); Andrew Flynn, Mountain View, CA (US); Evan Charlton, San Francisco, CA (US); Brian Clair Williammee, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/084,095

(22) Filed: Oct. 29, 2020

(65) Prior Publication Data
US 2021/0051186 A1 Feb. 18, 2021

Related U.S. Application Data

(63) Continuation of application No. 15/810,777, filed on Nov. 13, 2017, now Pat. No. 10,848,528, which is a
(Continued)

(51) Int. Cl.
*G06F 15/16* (2006.01)
*H04L 65/401* (2022.01)
(Continued)

(52) U.S. Cl.
CPC ...... *H04L 65/4015* (2013.01); *H04L 65/1069* (2013.01); *H04L 65/1089* (2013.01); *H04L 67/10* (2013.01); *H04L 67/141* (2013.01)

(58) Field of Classification Search
CPC ............ H04L 65/4015; H04L 65/1069; H04L 65/1089; H04L 67/10; H04L 67/141
(Continued)

(56) References Cited

U.S. PATENT DOCUMENTS

| 6,917,672 B2 | 7/2005 | Brown et al. |
| 6,975,719 B1 | 12/2005 | Gao et al. |

(Continued)

FOREIGN PATENT DOCUMENTS

| CN | 1842074 A | 10/2006 |
| CN | 101064644 A | 10/2007 |

(Continued)

OTHER PUBLICATIONS

Examination Report from counterpad European Application No. 14738692.4, dated Sep. 24, 2018, 7 pp.
(Continued)

*Primary Examiner* — Quang N Nguyen
(74) *Attorney, Agent, or Firm* — Shumaker & Sieffert, P.A.

(57) ABSTRACT

An example method comprises receiving, by at least one computing device, a first notification from a first mobile computing device and a second notification from a second mobile computing device. The method may further comprise determining, based at least in part on a comparison of the first notification to the second notification, that the first mobile computing device has initiated a phone call with the second mobile computing device. The method may additionally comprise responsive to determining that the first mobile computing device has initiated the phone call with the second mobile computing device, sending, a first message to the first mobile computing device using a first data connection, and sending, a second message to the second mobile computing using a second data connection, wherein
(Continued)

the first message and the second messages each indicate that the first and second mobile computing devices are able to exchange application data.

17 Claims, 5 Drawing Sheets

Related U.S. Application Data continuation of application No. 15/003,560, filed on Jan. 21, 2016, now Pat. No. 9,819,709, which is a continuation of application No. 13/919,975, filed on Jun. 17, 2013, now Pat. No. 9,246,988.

(51) Int. Cl.
  *H04L 67/10* (2022.01)
  *H04L 65/1069* (2022.01)
  *H04L 65/1089* (2022.01)
  *H04L 67/141* (2022.01)

(58) Field of Classification Search
  USPC ....................................................... 455/414.1
  See application file for complete search history.

(56) References Cited

U.S. PATENT DOCUMENTS

| | | | |
|---|---|---|---|
| 7,681,219 B2 | 3/2010 | Conradt | |
| 7,761,900 B2 | 7/2010 | Crayford | |
| 7,783,773 B2 | 8/2010 | Wu | |
| 7,933,632 B2 | 4/2011 | Flynt | |
| 8,161,174 B1* | 4/2012 | Sankaranaraynan | G04R 20/02 |
| | | | 709/229 |
| 8,220,018 B2 | 7/2012 | de Andrade | |
| 8,229,410 B2 | 7/2012 | Horodezky et al. | |
| 8,249,925 B2 | 8/2012 | Broms | |
| 8,597,028 B2 | 12/2013 | Paul | |
| 8,625,607 B2 | 1/2014 | Rieger | |
| 8,676,273 B1* | 3/2014 | Fujisaki | H04M 3/533 |
| | | | 455/567 |
| 8,745,133 B2 | 6/2014 | Martinez | |
| 8,812,377 B2 | 8/2014 | Ljunggren | |
| 9,246,988 B2 | 1/2016 | Brunsman et al. | |
| 9,253,437 B2* | 2/2016 | Nishida | H04W 36/0027 |
| 10,708,383 B2* | 7/2020 | Garg | H04L 67/2857 |
| 10,708,420 B2* | 7/2020 | Karani | G10L 15/1822 |
| 2002/0034954 A1* | 3/2002 | Nohara | G06F 16/9537 |
| | | | 455/456.3 |
| 2003/0040302 A1 | 2/2003 | Okada | |
| 2003/0124976 A1 | 7/2003 | Tamaki et al. | |
| 2004/0133907 A1 | 7/2004 | Rodriguez | |
| 2005/0143141 A1 | 6/2005 | Ochi et al. | |
| 2006/0058020 A1 | 3/2006 | Fox et al. | |
| 2009/0168762 A1 | 7/2009 | Lugt et al. | |
| 2010/0022230 A1* | 1/2010 | Shim | H04M 1/72505 |
| | | | 455/417 |
| 2010/0070380 A1* | 3/2010 | Park | G06Q 30/06 |
| | | | 705/26.1 |
| 2010/0120434 A1 | 5/2010 | Hasegawa | |
| 2010/0208030 A1 | 8/2010 | Kim et al. | |
| 2010/0211638 A1* | 8/2010 | Rougier | G06F 8/30 |
| | | | 709/205 |
| 2010/0226378 A1 | 9/2010 | Masuda et al. | |
| 2011/0124362 A1 | 5/2011 | Wakasa et al. | |
| 2011/0141949 A1 | 6/2011 | Chien et al. | |
| 2011/0237230 A1* | 9/2011 | Li | H04M 1/72513 |
| | | | 455/414.1 |
| 2011/0276634 A1* | 11/2011 | Maruyama | G06F 13/385 |
| | | | 709/205 |
| 2012/0089700 A1 | 4/2012 | Safruti | |
| 2012/0129508 A1 | 5/2012 | Gentry | |
| 2012/0178417 A1* | 7/2012 | Hapsari | H04W 76/10 |
| | | | 455/411 |
| 2012/0188892 A1* | 7/2012 | Demilie | H04M 3/42272 |
| | | | 370/252 |
| 2012/0270548 A1* | 10/2012 | Nishida | H04W 60/00 |
| | | | 455/435.2 |
| 2012/0315881 A1 | 12/2012 | Woloshyn | |
| 2013/0189961 A1 | 7/2013 | Channakeshava et al. | |
| 2014/0036029 A1 | 2/2014 | Song et al. | |
| 2014/0372555 A1 | 12/2014 | Brunsman et al. | |
| 2015/0111535 A1* | 4/2015 | Song | H04L 63/18 |
| | | | 455/411 |
| 2016/0142452 A1 | 5/2016 | Brunsman et al. | |
| 2020/0066414 A1* | 2/2020 | Neff | G16H 10/20 |
| 2021/0142792 A1* | 5/2021 | Wantland | G10L 15/30 |

FOREIGN PATENT DOCUMENTS

| | | |
|---|---|---|
| CN | 101083700 A | 12/2007 |
| CN | 101287163 A | 10/2008 |
| CN | 101645952 A | 2/2010 |
| CN | 101815272 A | 8/2010 |
| CN | 102064949 A | 5/2011 |
| CN | 102077164 A | 5/2011 |
| CN | 102810316 A | 12/2012 |
| CN | 102821214 A | 12/2012 |
| CN | 102833328 A | 12/2012 |
| CN | 102843458 A | 12/2012 |
| CN | 102946461 A | 2/2013 |
| WO | 2012052709 A1 | 4/2012 |

OTHER PUBLICATIONS

First Office Action, and translation thereof, from counterpart Chinese Patent Application No. 201480039989.5, dated Jan. 22, 2018, 12 pp.
First Office Action, and translation thereof, from counterpart Indian Application No. 7653/CHENP/2015, dated Oct. 24, 2019, 7 pp.
International Search Report and Written Opinion from International Application No. PCT/US2014/042605, dated Sep. 5, 2014, 10 pages.
Notification to Grant and claims to Grant dated Sep. 29, 2018, from counterpart Chinese Application No. 201480039989.5, 8 pp.
Office Action from counterpart European Application No. 14738692.4 dated Nov. 26, 2019, 9 pp.
Prosecution History from U.S. Appl. No. 13/919,975, dated May 1, 2015 through Sep. 15, 2015, 42 pp.
Prosecution History from U.S. Appl. No. 15/003,560, dated Aug. 23, 2016 through Jul. 18, 2017, 77 pp.
Response to Examination Report dated Sep. 24, 2018, from counterpart European Application No. 14738692.4, filed Feb. 1, 2019, 11 pp.
Response to Examination Report from Counterpart European Application No. 14738692.4, dated Nov. 26, 2019, filed Mar. 20, 2020 3pp.
Response to First Examination Report from counterpart Indian Application No. 7653/CHANP/2015, dated Oct. 24, 2019, filed Jan. 30, 2020, 12 pp.
Prosecution History from U.S. Appl. No. 15/810,777, dated Sep. 5, 2019 through Jul. 31, 2020, 60 pp.
First Office Action and Search Report, and translation thereof, from counterpart Chinese Application No. 201811495413.6, dated Dec. 3, 2020, 19 pp.
Examination Report from counterpart European Patent Application No. 14738692.4, dated Jun. 25, 2021, 4 pp.
Notification to Grant from counterpart Chinese Application No. 201811495413.6, dated May 25, 2021, 8 pp.
International Preliminary Report on Patentability from International Application No. PCT/US2014/042605, dated Dec. 30, 2015, 8 pp.
Response to Examination Report from counterpart European Application No. 14738692.4, dated Jun. 25, 2021, filed Oct. 20, 2021, 10 pp.
Hearing Notice from counterpart Indian Application No. 7653/CHENP/2015 dated Feb. 1, 2022, 14 pp.

\* cited by examiner

MANAGING DATA COMMUNICATIONS BASED ON PHONE CALLS BETWEEN MOBILE COMPUTING DEVICES

This application is a continuation of U.S. application Ser. No. 15/810,777, filed Nov. 13, 2017, now U.S. Pat. No. 10,848,528, which is a continuation of U.S. application Ser. No. 15/003,560, filed Jan. 21, 2016, now U.S. Pat. No. 9,819,709, which is a continuation of U.S. application Ser. No. 13/919,975, filed Jun. 17, 2013, now U.S. Pat. No. 9,246,988, the entire contents of each of which are incorporated herein in their entirety.

TECHNICAL FIELD

The disclosure relates to data communications between mobile computing devices.

BACKGROUND

Current mobile computing devices have broad capabilities for communicating with other devices or computers. For example, many mobile computing devices include a number of antennas that allow the mobile computing devices to communicate via a variety of network types. Some example networks include traditional telephony networks for transferring voice information, data networks, wired networks, and wireless networks, among other network types. Many companies provide services to enhance the functionality of such mobile computing devices. For example, some companies may allow a mobile computing device to store data on company servers and allow a user to access the data from the user's mobile computing device, thereby effectively increases the data storage capacity of mobile computing devices. Some companies may provide other services for use by mobile computing devices, such as data sharing. Generally, these types of services operate by communicating over one or more data networks.

SUMMARY

In one example, a method comprises receiving, by at least one computing device, a first notification from a first mobile computing device and a second notification from a second mobile computing device. The method may further comprise determining, by the at least one computing device and based at least in part on a comparison of the first notification to the second notification, that the first mobile computing device has initiated a phone call with the second mobile computing device. After determining that the first mobile computing device has initiated a phone call with the second computing device, the method may additionally comprise responsive to determining that the first mobile computing device has initiated the phone call with the second mobile computing device, sending, by the at least one computing device, a first message to the first mobile computing device using a first data connection, and sending, by the at least one computing device, a second message to the second mobile computing using a second data connection, wherein the first message and the second messages each indicate that the first and second mobile computing devices are able to exchange application data.

In another example, a computing system comprises at least one processor and at least one communication unit configured to receive a first notification from a first mobile computing device and a second notification from a second mobile computing device. The at least one processor is configured to determine, based at least in part on a comparison of the first notification to the second notification, that the first mobile computing device has initiated a phone call with the second mobile computing device, and wherein responsive to the at least one processor determining that the first mobile computing device has initiated the phone call with the second mobile computing device, the at least one communication unit is configured to send a first message to the first mobile computing device using a first data connection, and to send a second message to the second mobile computing device using a second data connection. The first message and second messages each indicate that the first and second mobile computing devices are able to exchange application data.

In another example, a computer-readable medium is encoded with instructions. The instructions cause at least one programmable processor to receive a first notification from a first mobile computing device and a second notification from a second mobile computing device, determine based at least in part on a comparison of the first notification to the second notification, that the first mobile computing device has initiated a phone call with the second mobile computing device, and responsive to determining that the first mobile computing device has initiated the phone call with the second mobile computing device, send a first message to the first mobile computing device using a first data connection, and send a second message to the second mobile computing device using a second data connection. The first and second messages each indicate that the first and second mobile computing devices are able to exchange application data.

The details of one or more examples are set forth in the accompanying drawings and the description below. Other features, objects, and advantages will be apparent from the description and drawings, and from the claims.

DETAILED DESCRIPTION

In general, the techniques of the present disclosure relate to managing data communications between at least two mobile computing devices based on a telephony connection (e.g., phone call). For example, a first mobile computing device may initiate a phone call with a second mobile computing device. The second mobile computing device may accept the phone call, thereby connecting the two mobile computing devices over a telephony network. Based on this established telephony connection, one or more data connections may be established between the two mobile computing devices, thereby allowing the mobile computing devices to exchange data. Establishing these one or more data connections based on the telephony connection may allow users of mobile computing devices to more easily share information, for example without necessarily having to end the phone call or open other applications in order to transfer the data.

Certain current mobile computing devices may require a user to open a separate program, and possibly to log into one or more user accounts, in order for a mobile computing device to exchange application data with another mobile computing device. Other current devices may even require a mobile computing device to terminate the present phone call prior to initiating the application data transfer. Techniques of the present disclosure may allow mobile computing devices to transfer data based on a prior phone call initiated between these mobile computing device users. For example, in some instances, one or more computing devices (e.g., data servers) may identify when two or more mobile computing devices are engaged in a phone call and allow these mobile computing devices to utilize one or more data transfer capabilities. The mobile computing devices may be able to exchange data without necessarily terminating a current phone call.

Figure 1:
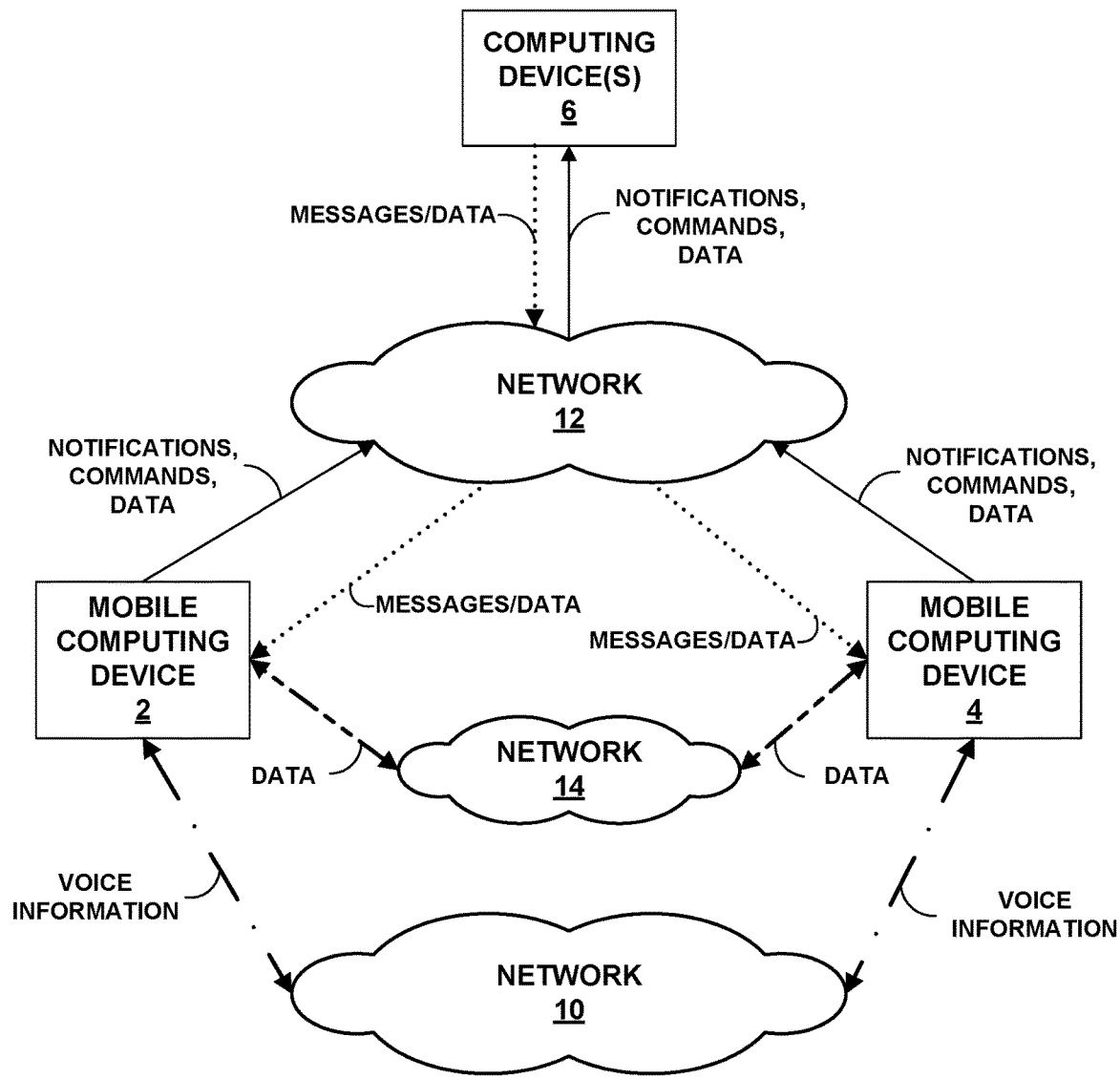
FIG. 1 is a conceptual diagram illustrating example communications between various computing devices and mobile computing devices, according to one or more techniques of the present disclosure.

FIG. 1 is a conceptual diagram illustrating example communications between various computing devices and mobile computing devices, according to one or more techniques of the present disclosure. FIG. 1 illustrates one or more computing devices 6, mobile computing device 2, mobile computing device 4, network 10, network 12, and network 14. Throughout this description, a voice communication over network 10 may be referred to as a 'phone call.' That is, when mobile computing devices 2 and 4 are communicating, or attempting to communicate over network 10, the present description may describe this communication as a phone call. Additionally, the term 'application data' as used herein is used generally to describe data other than voice information included in a voice communication. For example, application data may include text, photographs, videos, or any data other than voice information.

In some examples, mobile computing device 2 and mobile computing device 4 may communicate over a first network, such as network 10. Mobile computing devices 2 and 4 may contain hardware, such as one or more antennas, that allow mobile computing devices 2 and 4 to communicate over network 10. In some examples, network 10 may be a wireless telephony network. Some examples include global system for mobile communications (GSM) networks and code division multiple access (CDMA) networks. Accordingly, mobile computing devices 2 and 4 may directly send and receive voice information over network 10 (as indicated in FIG. 1 by the double-sided, dash-dot lines connecting each of mobile computing device 2 and 4 to network 10).

Mobile computing devices 2 and 4 may be, for example, mobile phones (including smart phones). In other examples computing devices 2 and 4 may be laptop computers, desktop computers, tablet computers, smart television platforms, cameras, personal digital assistants (PDA's) or other devices that include data transfer capabilities. Computing devices 6 may be dedicated servers or desktop computers. However, in some examples, computing devices 6 may be mobile devices similar to mobile computing devices 2.

In some instances, it may be beneficial for computing devices 6 to receive one or more notifications when mobile computing devices 2 and 4 are connected through a network, such as network 10. Accordingly, in some examples, mobile computing device 2 initiates a phone call to mobile computing device 4 over network 10 by dialing a phone number associated with mobile computing device 4. Upon initiation of the phone call, mobile computing device 2 may send a first notification to computing devices 6 over a second network, such as network 12, indicating that mobile computing device 2 is initiating a phone call with mobile computing device 4. This first notification includes unique identifiers that identify both mobile computing device 2 and mobile computing device 4. For example, the unique identifiers may be the phone numbers or representations of the phone numbers (e.g., "hashes" of the phone numbers, as will be described in further detail below) associated with mobile computing device 2 and mobile computing device 4. In other examples, the unique identifier may be a representation of other numbers or device identifiers that uniquely identify mobile computing device 2 and mobile computing device 4.

In some examples, the notification may be encrypted. Accordingly, mobile computing device 2 may use an encryption algorithm to create a hash of the numbers or other unique identifiers and send the hash to computing devices 6. Computing devices 6 then receive the hashed notification and, using a complementary decryption algorithm, decrypts the hashed notification. In this manner, computing devices 6 may receive a notification that mobile computing device 2 has initiated a phone call with mobile computing device 4.

Upon receiving the initiated phone call, mobile computing device 4 may send a second notification to computing devices 6. Accordingly, if mobile computing device 4 accepts the initiated phone call from mobile computing device 2, mobile computing device 4 may send a second notification, complementary to the first notification sent by mobile computing device 2, to computing devices 6. For example, mobile computing device 4 may send a representation of the phone numbers associated with mobile computing devices 2 and 4, or other unique identifiers, to computing devices 6. As with the first notification sent by mobile computing device 2, this second notification may be in the form of a cryptographic hash. If mobile computing device 4 does not accept the initiated phone call from mobile computing device 2, mobile computing device 4 may not send any second notification to computing devices 6.

Upon receipt of the second notification from mobile computing device 4, computing devices 6 may attempt to match the first and second notifications received from mobile computing devices 2 and 4. For example, computing devices 6 may compare the unique identifiers included in the first and second notifications to ensure that the unique identifiers included match. That is, computing devices 6 may ensure that the first and second notifications contain the same unique identifiers.

As one illustrative example, mobile computing device 2 may be associated with a phone number 555-111-1111 and mobile computing device 4 may be associated with a phone number 555-222-2222. In this example, mobile computing device 2 (or, a user of mobile computing device 2) may dial the phone number of mobile computing device 4. Upon dialing, mobile computing device 2 sends a first notification to computing devices 6, including both phone numbers. Accordingly, the first notification may include a representation similar to (555-111-1111, 555-222-2222). Alternatively, as described above, mobile computing device 4 may send a hash of the phone numbers, for example, h(555-111-1111, 555-222-2222), where h( ) represents a hashing function.

Once mobile computing device 4 accepts the incoming call, a phone call is established and mobile computing device 4 sends a second notification to the computing devices 6. As with mobile computing device 2, this second notification may include the phone numbers of both mobile computing devices 2 and 4 (e.g., 555-111-1111, 555-222-2222, or, alternatively a hash of the phone numbers h(555-111-1111, 555-222-2222)). Upon receipt of both notifications, computing devices 6 may compare the first and second notifications to ensure that the notifications match. If computing devices 6 determine that both notifications match, computing devices 6 may determine that mobile computing devices 2 and 4 are engaged in a phone call.

As shown in FIG. 1, the first and second notifications may be sent over a network different from network 10. For example, the notifications sent by mobile computing devices 2 and 4 may be sent over network 12, as indicated by the solid single-arrowed lines in FIG. 1. In general, network 12 is any network capable of transferring application data between mobile computing devices 2 and 4 and computing device 6. In certain examples, network 12 operates according to hyper text transfer protocol (HTTP) standards for sending and receiving application data. Some implanted examples of network 12 include the various 3G, 4G, and other data networks administered by the various wireless telephony carriers. Some specific examples of these types of networks include enhanced data rates for GSM evolution (EDGE) networks, enhanced voice-data optimized (EV-DO) networks, and long term evolution (LTE) networks, among others Although networks 10 and 12 are depicted and described as separate networks, in at least one example, the networks may be the same network. That is, mobile computing devices 2 and 4 may establish a phone call over a network and mobile computing devices 2 and 4 may send first and second notifications to computing device 6 over that same network. In such an example, the network may be a data network capable of sending and receiving application data. The phone call may be established and handled using a Voice Over Internet Protocol (VOIP).

Once computing device 6 has determined that mobile computing devices 2 and 4 are engaged in a phone call, for example by matching the first and second notifications sent by the respective devices, computing devices 6 may establish a data connection between mobile computing devices 2 and 4 through a network that is a network capable of sending and receiving application data. In some examples, computing devices 6 may automatically establish a data connection in response to determining that mobile computing devices 2 and 4 are engaged in a phone call. Accordingly, once computing devices 6 establish these data connections with mobile computing devices 2 and 4, mobile computing devices 2 and 4 may each then exchange application data through this network to the other respective device. In other examples, computing devices 6 may direct mobile computing devices 2 and 4 to establish a data connection between the devices. That is, instead of computing devices 6 establishing the data connection, mobile computing devices 2 and 4 may establish the data connection.

In some examples, this network may be the same network over which mobile computing devices 2 and 4 send their respective notifications to computing devices 6. In other examples, computing devices 6 may establish the data connections with mobile computing devices 2 and 4 over a third network, such as network 14. Network 14 may be a WiFi network, a Bluetooth network, or other similar network types (e.g., short-range communication networks).

Once connected through network 12 or network 14, mobile computing devices 2 and 4 may exchange application data between respective devices. In some examples, mobile computing devices 2 and 4 may exchange application data directly between the devices. For example, mobile computing device 2 may send application data to network 12 or network 14, such as depicted by the solid single arrow line connecting mobile computing device 2 to network 12 or the dashed double-arrow line connecting mobile computing device 2 to network 14. Mobile computing device 4 may receive application data from network 12 or network 14, such as depicted by the dotted single arrow line connecting mobile computing device 2 to network 12 or the dashed double arrow line connecting mobile computing device 4 to network 14. Mobile computing device 4 may send, and mobile computing device 2 may receive, application data in a similar manner.

In other examples, mobile computing devices 2 and 4 may send and receive application data proxied through computing devices 6. In such examples, mobile computing device 2 sends application data to network 12, as indicated by the solid single-arrow line connecting mobile computing device 4 to network 12. Subsequently, computing devices 6 receive the application data from network 12 as indicated by the solid single-arrow line connecting network 12 to computing devices 2. Then, computing devices 6 send the application data received from mobile computing device 2 to network 12. Finally, mobile computing device 4 receives the application data from network 12, completing the transfer of application data from mobile computing device 2 to mobile computing device 4. This application data transfer is depicted by the dotted single-arrow lines connecting computing devices 6 to network 12 and network 12 to mobile computing devices 2 and 4.

In still other examples, users of mobile computing devices 2 and 4 may have associated online profiles or accounts that may contain application data stored on remote devices, such as computing devices 6. In such examples, instead of sending application data to mobile computing device 4, either directly or proxied through computing devices 6, mobile computing device 2 may command computing devices 6 to send the stored application data associated with an online profile or account to mobile computing device 4. For example, mobile computing device 2 may send a command, depicted by the solid single-arrow lines in FIG. 1, to computing device 6 via network 12. Upon receipt of the command, computing device 6 may retrieve the application data specified by the command and send the application data to mobile computing device 4 via network 12. In some examples, computing devices 6 may have direct access to the application data because computing devices 6 also store the online profiles or accounts associated with mobile computing devices 2 and 4 or with the users of mobile computing devices 2 and 4. In other examples, computing devices 6 may request the specified application data from one or more other computing devices (not shown).

In some examples, before mobile computing devices 2 and 4 exchange application data, computing devices 6 may send a message to each of mobile computing devices 2 and 4 indicating that additional features are available, for example that mobile computing devices 2 and 4 are able to exchange application data. Accordingly, computing devices 6 may send a first message to mobile computing device 2 through a first data connection via network 12. Computing device 6 may also send a second message to mobile computing device 4 through a second data connection via network 12. The first and second messages may indicate that mobile computing devices 2 and 4 may exchange application data such as contact information or photographs/image data. In other examples, each of mobile computing devices 2 and 4 may, based on the received first and second messages from computing devices 6, display one or more previously un-displayed options for sending application data. For example, the options may include an option for sending contact information, sending photographs, or initiating a video call with the other mobile computing device. Other examples may include options for sending any type of application data. Accordingly, mobile computing devices 2 and 4 may control the exchange of information through interaction with these additional features.

As shown in FIG. 1, the first and second messages indicating that mobile computing devices 2 and 4 may exchange application data may be sent from computing devices 6 via network 12 to mobile computing devices 2 and 4, as indicated by the dotted single-arrow. For example, computing devices 6 may send a first message to mobile computing device 2 via network 12, as depicted by the single-arrow dotted lines point from computing devices 6 to network 12 and from network 12 to mobile computing device 2. Similarly, computing devices 6 may send a second message to mobile computing device 4 via network 12, also as depicted by the single-arrow dotted lines pointing from computing devices 6 to network 12 and from network 12 to mobile computing device 4.

According to some techniques of the present disclosure, when either of the mobile computing devices 2 and 4 or computing devices 6 exchange application data, such as the application data sent directly between mobile computing devices 2 and 4, the application data sent between mobile computing devices 2 and 4 proxied through computing devices 6, or the application data sent from computing devices 6 to either of mobile computing devices 2 and 4, the application data exchange may occur separately, in a temporal sense, from the exchange of voice information associated with a phone call. For example, mobile computing devices 2 and 4, or computing devices 6, may not, in some instances, exchange application data concurrently with the phone call between mobile computing devices 2 and 4. In some examples, mobile computing devices 2 and 4 and/or computing devices 6 may initiate an exchange of application data while mobile computing devices 2 and 4 are engaged in a phone call, and the exchange of application data may continue beyond a termination of the phone call. That is, mobile computing devices 2 and 4 and/or computing devices 6 may continue to exchange application data after the phone call between mobile computing devices 2 and 4 has terminated.

In other examples, mobile computing devices 2 and 4 and/or computing devices 6 may not begin to exchange application data until after the phone call between mobile computing devices 2 and 4 has terminated (for example after computing device 6 and/or connection module 74 may receive one or more notifications from one or more of the mobile computing devices indicating that the phone call between the mobile computing devices has ended). For example, mobile computing devices 2 and 4 or computing devices 6 may receive instructions to exchange application data concurrently with a phone call between mobile computing devices 2 and 4, but may not initiate the application data exchange until after the phone call has terminated. In other examples, the data connections between mobile computing device 2, mobile computing device 4, and/or computing devices 6 may persist after the phone call has ended, thereby allowing mobile computing devices 2 and 4, or computing devices 6 to both receive instructions to exchange application data and to exchange application data after the phone call between mobile computing devices 2 and 4 has terminated.

According to some techniques of the present disclosure, before establishing any data connections with mobile computing devices 2 and 4, or directing mobile computing devices 2 and 4 to establish a data connection, computing devices 6 may perform one or more gateway checks. In at least one example, the one or more gateway checks include one or more privacy checks. For instance, mobile phone device users may not always want computing devices 6 to establish a data connection when initiating or receiving a phone call with another mobile computing device. Accordingly, in some examples, before establishing any data connections, computing devices 6 may check to see if the each of mobile computing devices 2 and 4 contains an identifier (e.g., a phone number or device identifier) of the other respective mobile computing device within a contact list. According to such examples, computing devices 6 may only establish a respective data connection with mobile computing devices 2 and 4, or direct mobile computing devices 2 and 4 to establish a data connection, if each mobile computing device 2 and 4 has a contact list containing an identifier of the other respective mobile computing device.

In some examples, one of the gateway checks includes determining whether one of mobile computing devices 2 and 4 is associated with a block list of one of the other respective mobile computing devices. A block list may include a list of mobile computing device identifiers, e.g., phone numbers, device identification numbers, and the like. Accordingly, computing devices 6 may determine whether one of mobile computing devices 2 and 4 is associated with a block list of one of the other respective mobile computing devices. In some examples, if computing devices 6 determines that one of the mobile computing devices 2 or 4 is included in a block list of the other mobile computing device, computing devices 6 may refrain from establishing a data connection with or between each of mobile computing devices 2 and 4.

In other examples, computing devices 6 may send a message to each of mobile computing devices 2 and 4 allowing the users of the respective mobile computing devices to indicate whether the users would like to establish a data connection between mobile computing devices 2 and 4. In still other examples, in response to receiving the first and second messages from computing devices 6, mobile computing devices 2 and 4 may display one or more options to users of the respective mobile computing devices 2 and 4. After receiving a selection of one of the options, a mobile computing device may send the selected option to mobile computing devices 6. In some examples, the selected option indicates whether to allow computing devices 6 to establish a data connection between mobile computing devices 2 and 4. In such examples, computing device 6 may only establish a data connection between mobile computing devices 2 and 4 if computing devices 6 receive an indication from mobile computing devices 2 and 4 allowing computing devices 6 to establish a data connection between the respective mobile computing devices.

According to other examples, even after establishing one or more data connections, computing devices 6 may determine not to transmit some or all of received application data to a receiving mobile computing device. For example, the one or more gateway checks may include one or more security checks. In one example security check, computing devices 6 may perform one or more virus scans on any received application data before sending the application data to one of mobile computing devices 2 or 4. As one example, after receiving application data from mobile computing device 2 intended for mobile computing device 4, computing devices 6 may detect the presence of malicious software within the application data received from mobile computing device 2, such as through positive identification during the virus scan. Computing device 6 may determine not to send the received application data to mobile computing device 4.

According to other examples, computing devices 6 may perform other security checks. For example, computing devices 6 may be configured according to one or more censorship settings. Computing devices 6 may be configured to not send any received application data that includes certain types of pictures (e.g., potentially offensive pictures) or application data containing certain words. In some instances, users of mobile computing devices 2 and 4 may configure such censorship preferences individually for their respective mobile computing devices. In such examples, prior to sending application data to a particular mobile computing device, computing devices 6 may receive any censorship preferences from the receiving mobile computing device and process the received application data according to the received censorship preferences. If computing devices 6 identify any violations of the received censorship settings, computing devices 6 may not send the received application data to the receiving mobile computing device.

Figure 2:
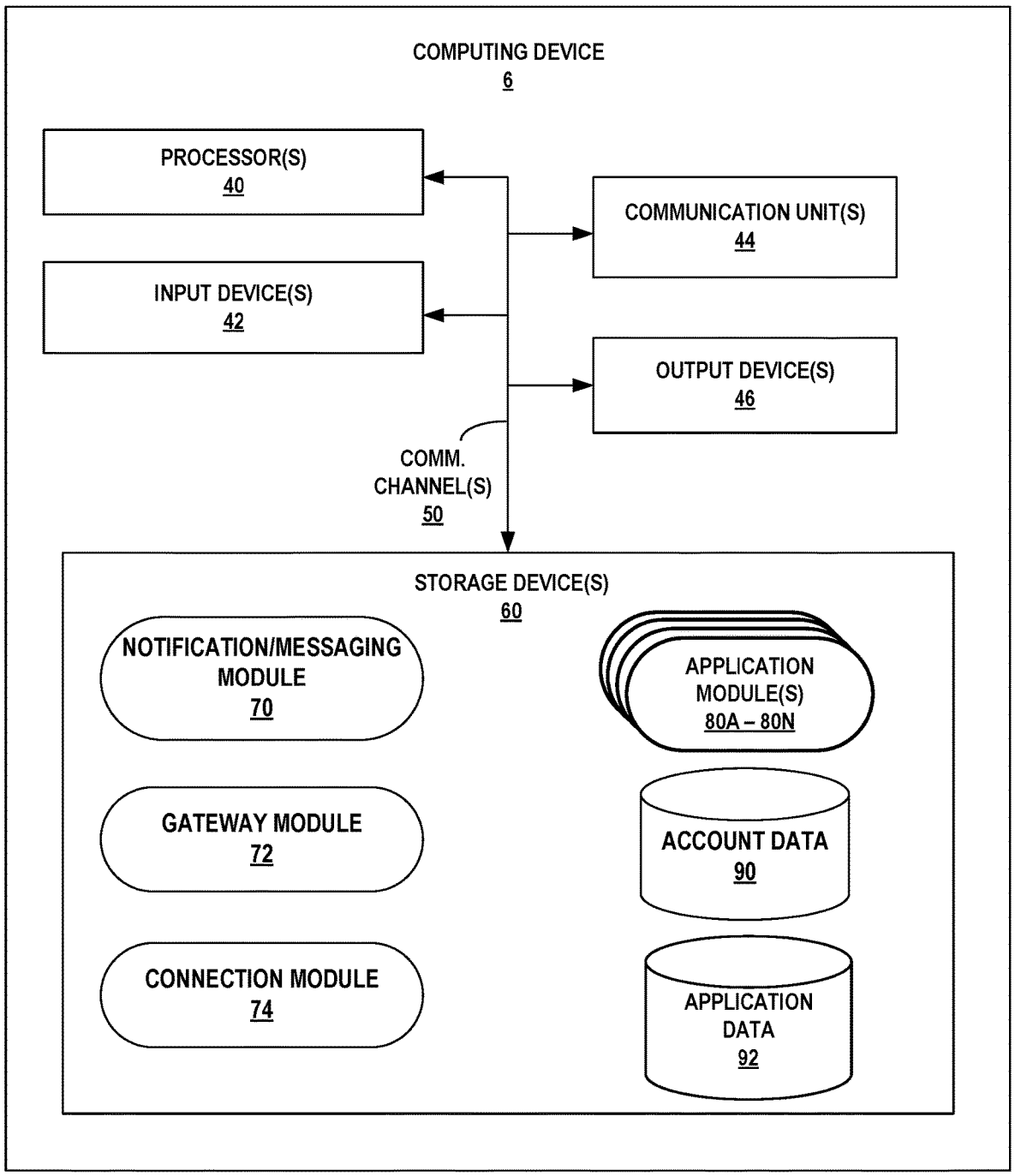
FIG. 2 is a block diagram illustrating an example of one of the computing devices shown in FIG. 1, in accordance with one or more aspects of the present disclosure.

FIG. 2 is a block diagram illustrating an example of one computing device of the one or more computing devices 6 shown in FIG. 1, in accordance with one or more aspects of the present disclosure. FIG. 2 illustrates only one particular example of one of the one or more computing devices 6 as shown in FIG. 1, and many other examples of may be used in other instances. For purposes of illustration only, the example computing device shown in FIG. 2 will be referred to below as computing device 6.

As shown in the specific example of FIG. 2, computing device 6 includes one or more processors 40, one or more input devices 42, one or more communication units 44, one or more output devices 46, and one or more storage devices 60. Storage devices 60, in one example, further include notification/messaging module 70, gateway module 72, connection module 74, application modules 80A-80N, account data 90, and application data 92. Each of components 40, 42, 44, 46, and 60 may be interconnected (physically, communicatively, and/or operatively) for inter-component communications. In some examples, communication channels 50 may include a system bus, a network connection, an inter-process communication data structure, or any other method for communicating data. As one example in FIG. 2, components 40, 42, 44, 46, and 60 may be coupled by one or more communication channels 50. Notification/messaging module 70, gateway module 72, connection module 74, and application modules 80A-80N may also communicate information with one another as well as with other components in computing device 6.

Processors 40, in one example, are configured to implement functionality and/or process instructions for execution within computing device 6. For example, processors 40 may be capable of processing instructions stored in storage device 60. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 60 may be configured to store information within computing device 6 during operation. Storage device 60, in some examples, is described as a computer-readable storage medium. In some examples, storage device 60 is a temporary memory, meaning that a primary purpose of storage device 60 is not long-term storage. Storage device 60, in some examples, is described as a volatile memory, meaning that storage device 60 does not maintain stored contents when the computer is turned off. Examples of volatile memories include random access memories (RAM), dynamic random access memories (DRAM), static random access memories (SRAM), and other forms of volatile memories known in the art. In some examples, storage device 60 is used to store program instructions for execution by processors 40. Storage device 60, in one example, is used by software or applications running on computing device 6 (e.g., notification/messaging module 70) to temporarily store information during program execution.

Additionally, the one or more storage devices 60 may include application modules 80A-80N and store account data 90 and application data 92. Application modules 80A-80N (collectively, "applications 80") may include functionality to perform any variety of operations. Applications 80 may execute functions for a specific application, such as a text application, photo viewer, social networking service, video application, email application, word processor, spreadsheet, web browser, multimedia player, server application, image capture application, audio application, and the like. In various instances, the other various modules or devices and one or more of applications 80 may exchange data. For example, connection module 74 may send a request for executed operation data to one of applications 80 (e.g., application 80A). In response, application 80A retrieves information based on the request and sends the retrieved information to connection module 74. In general, each of applications 80 may retrieve information based on the request and send any identified information to connection module 74. Account data 90 may comprise one or more user profiles. For example, a user may create a profile with a username and password. In some example, a user may store data associated with a created profile on computing device 6. The stored data may be represented by application data 92. In some examples, application data 92 also includes information stored by applications 80.

Storage devices 60, in some examples, also include one or more computer-readable storage media. Storage devices 60 may be configured to store larger amounts of information than volatile memory. Storage devices 60 may further be configured for long-term storage of information. In some examples, storage devices 60 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 6, in some examples, also includes one or more communication units 44. Computing device 6, in one example, utilizes communication units 44 to communicate with external devices via one or more networks, such as one or more wireless networks. Communication units 44 may include a network interface card, such as an Ethernet card, an optical transceiver, a radio frequency transceiver, or any other type of device that can send and receive information. Other examples of such network interfaces may include Bluetooth, 3G, 4G, and WiFi radios as well as Universal Serial Bus (USB). In some examples, computing device 6 utilizes communication unit 44 to wirelessly communicate with an external device such as a server.

Computing device 6, in some examples, also includes one or more input devices 42. Input device 42, in some examples, is configured to receive input from a user through tactile, audio, or video feedback. Examples of input device 42 include a presence-sensitive input device, a mouse, a keyboard, a voice responsive system, video camera, microphone or any other type of device for detecting a command from a user. In some examples, a presence-sensitive input device may include a presence-sensitive display, such as a touch-sensitive display.

Computing device 6, in some examples, may also include one or more output devices 46. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user.

Computing device 6 may include notification/messaging module 70. Notification/messaging module 70, in some examples, is configured to receive data received by communication units 44, such as, for example, first or second notifications. Additionally, notification/messaging module 70 may be configured to send messages, as will be described in further detail below.

Computing device 6 may also include gateway module 72. Gateway module 72, in some examples, is configured to perform one or more gateway checks. For example, gateway module 72 may scan received data for viruses, scan received data according to one or more received censorship settings, or determine whether first and second mobile computing devices contain a mobile computing device identifier of the respective other mobile computing device, such as in a contact list, as will be described in further detail below.

Computing device 6 may include connection module 74. Connection module 74, in some examples, is configured to establish a data connection between computing device 6 and one or more other computing devices, such as one or more mobile computing devices. In some examples, connection module 74 may establish a data connection between various computing and mobile computing devices in response to notification/messaging module 70 receiving a first and second notification. Further, once a data connection has been established, connection module 74 may be configured to send received (such as from a mobile computing device) or stored application data to an external device, such as a mobile computing device. Although as described herein connection module 74 is configured to send such application data, in other examples, one or more of the other modules may be configured to send such application data.

In accordance with techniques of this disclosure, notification/messaging module 70 may send and receive data, such as first and second messages and first and second notifications, using communication units 44. For example, communication units 44 may receive the first and second notifications and communicate the notifications to the other devices and modules of computing device 6, including notification/messaging module 70, via communication channels 50. Notification/messaging module 70 may also send first and second messages to communication units 44 which may then communicate the first and second messages with other devices, including devices external to computing device 6. Communication units 44 may further send and receive other data, such as application data, and communicate any such application data with the other devices and modules of computing device 6 or any devices external to computing device 6.

For example, notification/messaging module 70 may receive one or more notifications when other devices, such as mobile computing devices (e.g., example mobile computing devices 2 and 4 as shown in FIG. 1), connect through a first network. In some examples, this first network may be network 10. Accordingly, in some examples, mobile computing devices may initiate and establish a phone call over a first network. Upon initiation of the phone call, a first mobile computing device may send a first notification to computing device 6 over a second network, different from the first network, indicating that the first mobile computing device is initiating a phone call with a second mobile computing device. In some examples, the second network may be network 12. Accordingly, upon receiving this first notification, notification/messaging module 70 may determine that the first mobile computing device has initiated a phone call with a second mobile computing device. This first notification includes unique identifiers that identify both mobile computing devices. For example, the unique identifiers may be the phone numbers or representations of the phone numbers (e.g., "hashes" of the phone numbers, as will be described in further detail below) associated with the mobile computing devices, or other unique identifiers that may be a representation of other numbers or device identifiers. In some examples, the notification may be encrypted. Accordingly, notification/messaging module 70 may receive a hash of the notifications and, using a decryption algorithm, decrypt the hash of the notification.

Additionally, upon receiving the initiated phone call from the first mobile computing device, the second mobile computing device may send a second notification, and notification/messaging module 70 may receive this second notification. Accordingly, if the second mobile computing device accepts the initiated phone call from first mobile computing device, the second mobile computing device may send a second notification, complementary to the first notification sent by the first mobile computing device, to computing device 6. For example, the second mobile computing device may send a representation of the phone numbers associated with the first and second mobile computing devices, or other unique identifiers, to computing device 6. As with the first notification sent by the first mobile computing device, this second notification may be in the form of a cryptographic hash. If the second mobile computing device does not accept the initiated phone call from the first mobile computing device, the second mobile computing device may not send any second notification to computing device 6.

Upon receipt of the second notification from the second mobile computing device, notification/messaging module 70 may attempt to match the first and second notifications. For example, notification/messaging module 70 may compare the unique identifiers included in the first and second notifications to ensure that the unique identifiers included in both notifications match. Once notification/messaging module 70 has determined that the first and second notifications match, notification/messaging module 70 may determine that the first and second mobile computing devices are engaged in a phone call.

Once notification/messaging module 70 has determined that the first and second mobile computing devices are engaged in a phone call, for example by matching the first and second notifications sent by the respective devices, connection module 74 may establish one or more data connections between first and second mobile computing devices through a network that is a network capable of sending and receiving application data. In some examples, computing device 6 may establish a data connection automatically in response to receiving the first and second notifications or in response to determining that the first and second notifications match. In some examples, connection module 74 may establish a first data connection between computing device 6 and the first mobile computing device and a second data connection between computing device 6 and the second mobile computing device. In at least some examples, these one or more data network connections are through a second network different from the first network connecting the mobile computing devices through a phone call. In some examples, the one or more data network connections are through the second network over which the mobile computing devices sent notification/messaging module 70 first and second notifications, e.g., network 12. In other examples, the data network connections are over a third network that is different from both the first and second networks. Such a third network may be a network similar to network 14 as described with respect to FIG. 1. In other examples, connection module 74 may direct the first and second mobile computing devices to establish a data connection between the devices. That is, instead of connection module 74 establishing the data connection, the mobile computing devices may establish the data connection. The one or more data connections may allow the mobile computing devices and computing device 6 to each exchange application data.

In some examples, before various devices (e.g., the first and second mobile computing devices and computing device 6) exchange application data, notification/messaging module 70 may send a message to each of first and second mobile computing devices indicating that the mobile computing devices are able to exchange application data. Accordingly, notification/messaging module 70 may send a first message to the first mobile computing device. In some examples, this first message may be sent through a first data connection via the second network. Notification/messaging module 70 may also send a second message to the second mobile computing device through a second data connection via the second network. The first and second messages may indicate that the mobile computing devices may exchange application data such as contact information or photographs/image data. Notification/messaging module 70 may first send the messages and application data to communication units 44 via communication channels 50. Communication units 44 may then send the messages and application data to the mobile computing devices via established data connections between computing device 6 and the mobile computing devices.

According to some techniques of the present disclosure, before establishing any data connections with the first and second mobile computing devices, or directing the mobile computing devices to establish a data connection, gateway module 72 may perform one or more gateway checks. For example, before establishing any data connections, gateway module 72 may check to see if the each of the first and second mobile computing devices contains an identifier (e.g., a phone number or device identifier) of the other respective mobile computing device within a contact list. According to such examples, gateway module 72 may only establish a respective data connection with the mobile computing devices, or direct the mobile computing devices to establish a data connection, if each of the mobile computing devices has a contact list containing an identifier of the other respective mobile computing device.

In some examples, one of the gateway checks includes determining whether one of the first and second mobile computing devices is associated with a block list of one of the other respective mobile computing devices. A block list may include a list of mobile computing device identifiers, e.g., phone numbers, device identification numbers, and the like. Accordingly, gateway module 72 may determine whether one of first and second mobile computing devices is associated with a block list of one of the other respective mobile computing devices. In some examples, if gateway module 72 determines that one of the first or second mobile computing devices is included in a block list of the other mobile computing device, gateway module 72 may refrain from establishing a data connection with or between each of the first and second mobile computing devices. In some examples, gateway module 72 may store block lists within storage devices 60, such as in account data 90. In other examples, computing devices 6 may request a block list from each of the first and second mobile computing devices.

In other examples, gateway module 72 (e.g., through notification/messaging module 70 and/or communication units 44) may send a message to each of the first and second mobile computing devices. In some examples, the mobile computing devices may display the message, or another message generated locally on the mobile computing devices. The displayed message may allow a mobile computing device user to select one or more options. The one or more options may indicate whether to allow establishment of a data connection. According to such examples, connection module 74 may not establish any data connections until gateway module 72 has received an indication from each mobile computing device allowing computing device 6 to establish data connections between computing device 6 and the mobile computing devices.

According to other examples, gateway module 72 may be configured to send application data received from another device, such as the first or second mobile computing devices. According to such examples, even after one or more data connections has been established, gateway module 72 may determine not to transmit some or all of received application data to the receiving mobile computing device. For example, gateway module 72 may perform one or more virus scans on any received application data before sending the application data to one of the first or second mobile computing devices. As one example, after receiving application data from a first mobile computing device intended for the second mobile computing device, gateway module 72 may detect the presence of malicious software within the application data received from the first mobile computing device, such as through positive identification during the virus scan. Gateway module 72 may determine not to send the received application data to the second mobile computing device in this example.

According to other examples, gateway module 72 may be configured according to one or more censorship settings. For example, gateway module 72 may be configured to refrain from sending any received application data that includes certain types of pictures (e.g., potentially offensive pictures) or application data containing certain words. In some instances, users of the mobile computing devices may configure such censorship preferences individually for their respective mobile computing devices. In such examples, prior to sending application data to a particular mobile computing device, gateway module 72 may receive any censorship preferences from the receiving mobile computing device and process the received application data according to these censorship preferences. If gateway module 72 identifies any violations of the received censorship settings, gateway module 72 may not send the received application data to the receiving mobile computing device.

Once connection module 74 has established one or more data connections between computing device 6 and the first and second mobile computing devices, the mobile computing devices may exchange application data. In some examples, the mobile computing devices may exchange application data directly via one or more network connections. For example, the first and second mobile computing devices may exchange data over network 14. In other examples, the mobile computing devices may exchange application data proxied through computing device 6. For example, a first mobile computing device (e.g., mobile computing device 2) may send application data to connection module 74 via an established data connection. In some examples, communication units 44 may receive in the incoming application data. Communication units 44 may then send the application data to one or more devices or modules of computing device 6 via communication channels 50. In some examples, communication units 44 send the application data to connection module 74. Connection module 74 may then send the received application data to a second mobile computing device (e.g., mobile computing device 4) via a different data connection that has been established with this second mobile computing device. In some examples connection module 74 may send the application data back to communication units 44 via communication channels 50. Communication units may then send the application data to the second mobile computing device via an established data connection. In some examples, both data connections utilize the same network, e.g., network 12. Additionally, as described with respect to gateway module 72, one or more gateway checks may be performed before the application data is sent to the second mobile computing device.

In some examples, users of the first and second mobile computing devices may have associated online profiles or accounts that may contain application data stored on remote devices, such as computing device 6. For example, computing device 6 may store account data (e.g., user names and passwords) in storage devices 60 in account data 90. Additionally, computing device 6 may store application data associated with the profiles or accounts in account data 90 or application data 92. In such examples, computing device 6 in FIG. 2 and connection module 74 may receive a command from a first mobile computing device instructing computing device 6 and connection module 74 to send stored application data associated with a profile or account to a second mobile computing device. For example, communication units 44 may receive a command from a first mobile computing device instruction computing device 6 to send application data to a second mobile computing device. Communication units 44 may send the command to other devices and modules of computing device 6, including connection module 74, via communication channel 50. Accordingly, connection module 74 may then retrieve application data specified in the command from storage devices 60. For example, connection module 74 may retrieve application data from account data 90 or application data 92 via communication channels 50. Connection module 74 may then send the retrieved application data to communication units 44, where communication units 44 then send the application data to the second mobile computing device via an established data connection. In other examples, computing device 6 and connection module 74 may request the application data specified by the command from one or more other computing devices (not shown), if computing device 6 does not have stored the specified application data. After receiving the requested data, connection module 74 may send the application data to communication units 44 via communication channels 50 for sending to the second mobile computing device.

According to some techniques of the present disclosure, connection module 74 may continue to exchange application data after the phone call between the first and second mobile computing devices has terminated. For example, after establishing one or more data connections, connection module 74 may receive, from a first mobile computing device (e.g., mobile computing device 2), application data, or instructions to send stored application data to a second mobile computing device (e.g., mobile computing device 4). Once the application data and/or instructions have been received from the first mobile computing device, connection module 74 may begin to send the specified application data to the second mobile computing device. This data transfer is independent of the phone call between the first and second mobile computing devices. For example, connection module 74 may begin to transfer the application data and, in the process of transferring the data, the first and second mobile computing devices may independently terminate their phone call. However, connection module 74 will continue to transfer the specified application data until all of the application data has been transferred. In other examples, the established data connections(s) may further persist after the phone call between the first and second mobile computing devices has terminated. In such examples, connection module 74 may receive application data to send or instructions to send stored application data after the phone call has ended. In these examples, connection module 74 may not, in some instances, even have initiated the application data transfer until after the phone call between the first and second mobile computing devices has ended.

In still other examples, connection module 74 may receive application data and/or instructions to send stored application data concurrently with a phone call between the mobile computing devices, but may delay transferring the application data until after the phone has terminated (e.g., after computing device 6 and/or connection module 74 receive one or more notifications from one or more of the first and second mobile computing devices indicating that the phone call between these mobile computing devices has ended).

As described with respect to FIG. 2, notification/messaging module 70, gateway module 72, and connection module 74 have been described separately and as performing separate functions. However, in some examples, the described functions may be performed by additional or fewer modules. In addition, the functionality as described with respect to modules 70, 72, and 74 may be part of, or implemented by, one or more of application modules 80A-80N. In other examples, the functionality of modules 70, 72, and 74 may be part of an operating system of computing device 6. The operating system, in performing functions similar to modules 70, 72, and 74 and other functions, may interact with one or more application modules 80A-80N, for example through communication channels 50.

Figure 3:
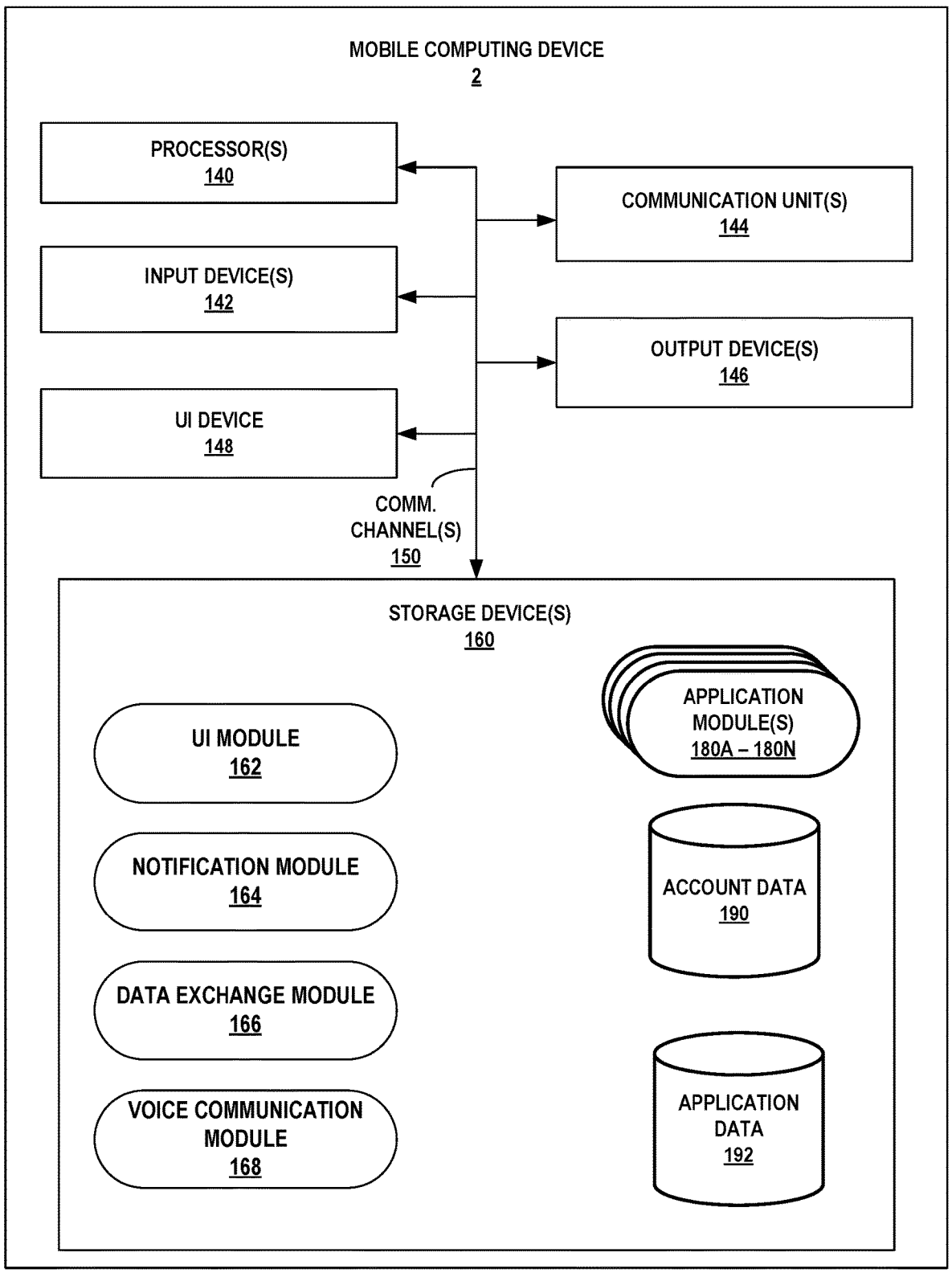
FIG. 3 is a block diagram illustrating an example of one of the mobile computing devices shown in FIG. 1, in according with one or more aspects of the present disclosure.

FIG. 3 is a block diagram illustrating an example of one of the mobile computing devices 2 and 4 shown in FIG. 1, in according with one or more aspects of the present disclosure. FIG. 3 illustrates only one particular example of mobile computing devices 2 and 4 as shown in FIG. 1, and many other examples of mobile computing devices 2 and 4 may be used in other instances. The example mobile computing device shown in FIG. 3 is mobile computing device 2.

In FIG. 3, mobile computing device 2 includes one or more processors 140, one or more input devices 142, one or more communication units 144, one or more output devices 146, one or more storage devices 160, and user interface (UI) device 148. Storage devices 160, in one example, further include UI module 162, notification module 164, data exchange module 166, voice communication module 168, application modules 180A-180N, account data 190, and application data 192. Each of components 140, 142, 144, 146, 148, and 160 may be interconnected (physically, communicatively, and/or operatively) for inter-component communications. In some examples, communication channels 150 may include a system bus, a network connection, an inter-process communication data structure, or any other method for communicating data. As one example in FIG. 3, components 140, 142, 144, 146, 148, and 160 may be coupled by one or more communication channels 150. UI module 162, notification module 164, data exchange module 166, voice communication module 168, and application modules 180A-180N may also communicate information with one another as well as with other components in mobile computing device 2.

Processors 140, in one example, are configured to implement functionality and/or process instructions for execution within mobile computing device 2. For example, processors 140 may be capable of processing instructions stored in storage device 160. Examples of processors 140 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 160 may be configured to store information within mobile computing device 2 during operation. Storage device 160, in some examples, is described as a computer-readable storage medium. In some examples, storage device 160 is a temporary memory, meaning that a primary purpose of storage device 160 is not long-term storage. Storage device 160, in some examples, is described as a volatile memory, meaning that storage device 160 does not maintain stored contents when the computer is turned off. Examples of volatile memories include random access memories (RAM), dynamic random access memories (DRAM), static random access memories (SRAM), and other forms of volatile memories known in the art. In some examples, storage device 160 is used to store program instructions for execution by processors 140. Storage device 160, in one example, is used by software or applications running on mobile computing device 2 (e.g., data exchange module 166) to temporarily store information during program execution.

Additionally, the one or more storage devices 160 may include application modules 180A-180N and store account data 190 and application data 192. Application modules 180A-180N (collectively, "applications 180") may include functionality to perform any variety of operations. Applications 180 may execute functions for a specific application, such as a text application, photo viewer, social networking service, video application, email application, word processor, spreadsheet, web browser, multimedia player, server application, image capture application, audio application, and the like.

As described with respect to FIG. 3, UI module 162, notification module 164, and data exchange module 166, and voice communication module 168 have been described separately and as performing separate functions. However, in some examples, the described functions may be performed by additional or fewer modules. In addition, the functionality as described with respect to modules 162, 164, 166, and 168 may be part of, or implemented by, one or more of application modules 180A-180N. In other examples, the functionality of modules 162, 164, 166, and 168 may be part of an operating system of mobile computing device 2. The operating system, in performing functions similar to modules 162, 164, 166, and 168 and other functions, may interact with one or more application modules 180A-180N, for example through communication channels 150.

In various instances, the other various modules or devices and one or more of applications 180 may exchange data. For example, data exchange module 166 may send a request for executed operation data to one of applications 180 (e.g., application 180A). In response, application 180A retrieves information based on the request and sends the retrieved information to data exchange module 166. In general, each of applications 180 may retrieve information based on the request and send any identified information to data exchange module 166. Account data 190 may comprise one or more user profiles. For example, a user may create a profile with a username and password. In some example, a user may store data associated with a created profile on mobile computing device 2. The stored data may be represented by application data 192. In some examples, application data 192 also includes information stored by applications 180.

Storage devices 160, in some examples, also include one or more computer-readable storage media. Storage devices 160 may be configured to store larger amounts of information than volatile memory. Storage devices 160 may further be configured for long-term storage of information. In some examples, storage devices 160 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Mobile computing device 2, in some examples, also includes one or more communication units 144. Mobile computing device 2, in one example, utilizes communication unit 144 to communicate with external devices via one or more networks, such as one or more wireless networks. Communication unit 144 may be a network interface card, such as an Ethernet card, an optical transceiver, a radio frequency transceiver, or any other type of device that can send and receive information. Other examples of such network interfaces may include Bluetooth, 3G, 4G, and WiFi radios as well as Universal Serial Bus (USB). In some examples, mobile computing device 2 utilizes communication unit 144 to wirelessly communicate with an external device such as a server.

Mobile computing device 2, in some examples, also includes one or more input devices 142. Input device 142, in some examples, is configured to receive input from a user through tactile, audio, or video feedback. Examples of input device 142 include a presence-sensitive input device, a mouse, a keyboard, a voice responsive system, video camera, microphone or any other type of device for detecting a command from a user. In some examples, a presence-sensitive input device includes a presence-sensitive display, such as a touch-sensitive display.

Mobile computing device 2, in some examples, may also include one or more output devices 146. Output device 146, in some examples, is configured to provide output to a user using tactile, audio, or video stimuli. Output device 146, in one example, includes a presence-sensitive display, a sound card, a video graphics adapter card, or any other type of device for converting a signal into an appropriate form understandable to humans or machines. Additional examples of output device 146 include a speaker, a cathode ray tube (CRT) monitor, a liquid crystal display (LCD), or any other type of device that can generate intelligible output to a user. In some examples, UI device 148 may include functionality of input device 142 and/or output device 146. In the example of FIG. 2, UI device 148 may be a touch-sensitive display.

In some examples, UI device 148 may include functionality of input devices 142 and/or output devices 146. In the example of FIG. 2, UI device 148 may be or may include a presence-sensitive display. In some examples, a presence-sensitive display may detect an object at and/or near the presence-sensitive display. As one example range, a presence-sensitive display may detect an object (e.g., input unit), such as a finger or stylus that is within two inches or less of the presence-sensitive display. The presence-sensitive display may determine a location (e.g., an (x,y) coordinate) of the presence-sensitive display at which the object was detected. In another example range, a presence-sensitive display may detect an object six inches or less from the presence-sensitive display and other example ranges are also possible. The presence-sensitive display may determine the location of the display selected by a user's finger using capacitive, inductive, and/or optical recognition techniques. In some examples, presence-sensitive display provides output to a user using tactile, audio, or video stimuli as described with respect to output device 146. In the example of FIG. 2, UI device 148 presents a user interface, and other various functions and applications executing on mobile computing device 2 at the presence-sensitive display of UI device 148.

As shown in FIG. 3, mobile computing device 2 may include UI module 162. UI module 162 may perform one or more functions to receive input, such as user input or network data, and send such input to other components associated with mobile computing device 2, such as UI device 148. For example, UI module 162 may determine user input performed by a user at UI device 148. UI module 162 may also receive data from components associated with mobile computing device 2, such as applications 180. Using the data, UI module 162 may cause other components associated with mobile computing device 2, such as UI device 148, to provide output based on the data. For instance, UI module 162 may receive data from applications 180 that causes UI device 148 to modify an outputted graphical user interface (GUI), including brightness level and/or contrast level.

UI module 162 may be implemented in various ways. For example, UI module 162 may be implemented as a downloadable or pre-installed application or "app." In another example, UI module 162 may be implemented as part of a hardware unit of mobile computing device 2. In another example, UI module 162 may be implemented as part of an operating system of mobile computing device 2.

Mobile computing device 2 may include notification module 164. Notification module 164, in some examples, is configured to send and receive data to an external device, such as through communication units 144. Some example data that notification module 164 may send and receive include first or second notifications and first or second messages.

Mobile computing device 2 may also include data exchange module 166. Data exchange module 166 is configured to send application data to external devices, such as through communication units 144. In some examples, data exchange module 166 is configured to send a command to an external device to send application data stored on the external device to another mobile computing device (e.g., mobile computing device 4).

Mobile computing device 2 may include voice communication module 168. Voice communication module 168 is configured connect to telephony networks and to receive voice information input, for example from input device 142, and send that that voice information to another mobile computing device. Voice communication module 168 may also receive voice information from communication units 144 and send the voice information to output device 146. In this manner, mobile computing device 2, through voice communication module 168 and other devices and modules, is configured to perform phone calls.

In accordance with techniques of this disclosure, notification module 164 may send and receive data, such as notifications and messages, through communication units 144. For example, notification module 164 may generate a notification and communicate the notification with communication units 144 via communications channels 150. Communication units 144 may then send the notification to other devices and modules of mobile computing device 2, or to devices external to mobile computing device 2. In other examples, communication units 144 may receive one or more messages from a device external to mobile computing device 2. Communication units 144 may then communicate the message with notification module 166, for example through communication channels 150.

For example, mobile computing device 2 may be configured to connect to a first network, such as a telephony network. In some examples the first network is a telephony network which may conduct voice information, for example during a phone call. In some examples, the first network may be network 10 of FIG. 1. Accordingly, voice communication module 168 may be configured to connect mobile computing device 2 to the first telephony network and send and receive voice information to and from another mobile computing device during a phone call.

After establishing a phone call with another mobile computing device, notification module 164 may generate a notification. This notification may include unique identifiers that identify both mobile computing devices engaged in the phone call. For example, the unique identifiers may be the phone numbers or representations of the phone numbers (e.g., "hashes" of the phone numbers, as will be described in further detail below) associated with the mobile computing devices, or other unique identifiers that may be a representation of other numbers or device identifiers. In some examples, the notification may be encrypted. Accordingly, notification module 164 may generate a hash of the notification using an encryption algorithm.

Notification module 164 may communicate this notification to communication units 144, which may send the notification to an external device. Notification module 164 may communication the notification via communications channels 150. Communication units 144 may send this notification over a second network, different from the first telephony network, which is capable of transmitting application data. In some examples, this second network is network 12 or network 14 of FIG. 1. In some examples, the notification is an indication that mobile computing device 2 has established a phone call with another mobile computing device. In other examples, the notification may indicate that mobile computing device 2 is attempting to establish a phone call with another mobile computing device. Communication units 144 may send the notification to a third computing device, e.g., a computing device different from the two mobile computing devices. In some examples, the third computing device may be computing device 6 as described herein with respect to FIGS. 1 and 2. In this manner, mobile computing device 2 may communicate to one or more other devices that mobile computing device 2 has established, or is attempting to establish, a phone call with another mobile computing device.

In some examples, notification module 164 may also receive one or more messages. For example, after sending the one or more communications, notification module 164 may receive one or more messages from one or more external computing devices that indicate that mobile computing device 2 may exchange data with the other mobile computing device associated with the phone call. For example, communication units 144 may receive a message and communicate the message to other devices and modules of mobile computing device 2, including notification module 164, via communications channels 150. In some examples, the message may indicate that mobile computing device 2 is now connected through a third network, different from the first telephony network, where the third network is a network capable of communicating application data. In some examples, the third network is the same network as the second network via which mobile computing device 2 sent the notification, such as network 12 of FIG. 1. In other examples, the third network is an additional network distinct from either of the first telephony network and the second network, such as network 14 of FIG. 1

In some examples, the message may indicate computing device 6 is attempting to establish a data connection with mobile computing device 2 or between mobile computing device 2 and another mobile computing device, e.g., mobile computing device 4. In such examples, notification module 164 may send a query to UI device 148. UI device 148 may display the query or a related message to mobile computing device 2 user. The query or other message may include one or more options indicating whether to allow computing device 6 to establish one or more data connections. For example, the user may select one or more options displayed on by UI device 148. UI device 148 may communicate the user selection to the other modules and devices of mobile computing device 2, including notification module 164, via communications channels 150. Notification module 164 may then send the user selection to the one or more external computing devices.

In some examples, instead of receiving a message indicating that mobile computing device 2 may now exchange data with the other mobile computing device engaged in the phone call, e.g., mobile computing device 4, the message may direct mobile computing device 2 to establish a data connection with the other mobile computing device. For example, after receiving a message, data exchange module 166 may establish a data connection over a network capable of transmitting application data with the other mobile computing device engaged in the phone call, for example networks 12 and/or 14 as described in FIG. 1. In some examples, data exchange module 166 may not establish any data connections unless data exchange module 166 has received one or more signals from the other external devices, e.g., mobile computing device 4 or computing device 6, indicating one or more users of the other one or more external devices accept data exchange module 166 establishing one or more data connections.

Once mobile computing device 2 and the other mobile computing device are connected through a data connection, data exchange module 166 may send and receive application data. For example, a user may direct to mobile computing device 2, such as through UI device 148, to send certain application data to the other mobile computing device. Data exchange module 166 may then retrieve the specified application data from storage device 160 and send the application data to communication units 144 for communication to the other mobile computing device (e.g., mobile computing device 4). In some examples, instead of sending the application data directly to the other mobile computing device, data exchange module 166 may instead send the application data first to an external device (e.g., an external device like computing device 6). In still other examples, data exchange module 166 may send a command to an external device directing the external device to send application data stored on or accessible by the external device to the other mobile computing device.

According to some aspects of the present disclosure, before receiving a message indicating that mobile computing device 2 and the other mobile computing device engaged in the phone call may exchange application data, mobile computing device 2 may receive a contact list query. For example, an external device, before establishing a data connection between the two mobile computing devices, may request that an identifier of the other mobile computing device is present in a contact list of mobile computing device 2. Mobile computing device 2 may store a contact list in storage device 160, such as in application data 192. Accordingly, notification module 164 may receive the identifiers stored in the contact list from storage device 160 and may determine if the identifier of the other mobile computing device matches an entry in the contact list. Notification module 164 may then send this determination back to the external device. In some examples, the external device may not establish the data connection between the two devices unless the identifier of the other mobile computing device is present in the contact list of mobile computing device 2.

In some examples, an external device may request a block list from mobile computing device 2. A block list may include a list of mobile computing device identifiers, e.g., phone numbers, device identification numbers, and the like. Accordingly, the external device may determine whether mobile computing device 2 includes the identifier associated with the other mobile computing device within a block. In some examples, if the external device determines that mobile computing device 2 does include the other mobile computing device identifier in a block list, the external device may refrain from establishing a data connection with mobile computing device 2 or between each of mobile computing devices 2 and the other mobile computing device. In some examples, mobile computing device 2 may store block lists within storage devices 160, such as in account data 190.

Also according to aspects of the present disclosure, before receiving application data, mobile computing device 2 may receive a request for one or more censorship settings. For example, mobile computing device 2 may store one or more censorship settings in storage device 160, such as in account data 190 or application data 192. The censorship settings may indicate one or more of a variety of data a user of mobile computing device 2 may desire not to receive. For example, the censorship settings may indicate that a user does not want to receive certain types of pictures (e.g., potentially offensive pictures) or application data containing certain words. Accordingly, notification module 164 may retrieve the censorship settings from storage device 160 and send the retrieved censorship settings to the requesting device.

In some examples, the exchange of application data may occur after the phone call between mobile computing device 2 and the other mobile computing device has ended. For example, data exchange module 166 may receive direction to send application data to the other mobile computing device while the mobile computing devices are engaged in a phone call. In some examples, data exchange module 166 may initiate sending the application data concurrently with the phone call, but the data exchange may continue after the phone call has terminated. In other examples, data exchange module 166 not receive the direction during the phone call, but data exchange module 166 may not initiate sending the application data until after the phone call between the two mobile computing devices has terminated.

Although a variety of functions described herein have been described separately, with respect to mobile computing device 2 and computing device 6, each of the functions of computing device 6 may be performed by another mobile computing device. For example, instead of computing device 6 receiving the first and second notifications, one or both of the mobile computing devices engaged in the phone call may both send and receive such notifications. Further, one or both of the mobile computing devices may perform the matching function as described with respect to computing device 6. The mobile computing devices may further generate and send the described messages and establish data connections directly without involvement of computing device 6. The description of computing device 6 performing these and other functions is only representative of a subset of the contemplated embodiments.

Figure 4:
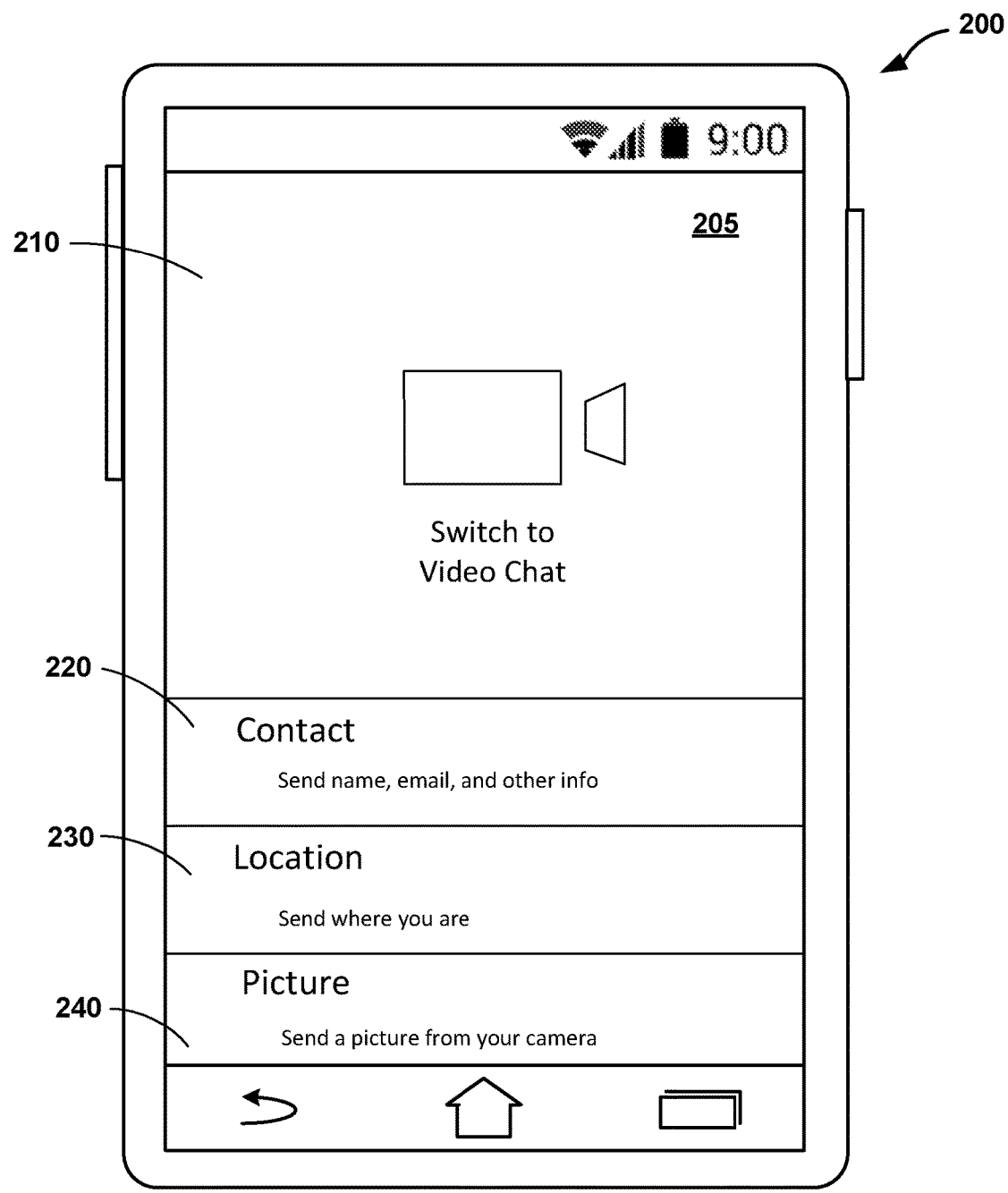
FIG. 4 is a conceptual diagram illustrating an example user interface (UI) provided by a mobile computing device, in accordance with one or more aspects of the present disclosure.

FIG. 4 is a conceptual diagram illustrating an example user interface (UI) provided by a mobile computing device, in accordance with one or more aspects of the present disclosure. FIG. 4 shows an example mobile computing device 200 with display 205 (e.g., a presence-sensitive display). Mobile computing device 200 may be one example of mobile computing device 2 and/or mobile computing device 4. The displayed UI may represent one example of the UI displayed by mobile computing device 200 after a data connection has been established with another mobile computing device based on a phone call. As described with respect to FIG. 1, after the data connection has been established, a mobile computing device may present one or more additional features to a mobile computing device user. For example, computing devices 6 of FIG. 1 may receive first and second notifications from each of mobile computing devices 2 and 4. Based on the notifications, computing devices 6 may establish a data connection between computing devices 6 and each of mobile computing devices 2 and 4. In some examples, computing devices 6 may establish a first data connection with a first one of mobile computing devices 2 and 4 and a second data connection with a second one of mobile computing devices 2 and 4. In response to receiving a message from computing devices 6, each of mobile computing devices 2 and 4 may display the one or more additional features as described below. Accordingly, the data exchange associated with the additional features may occur after a data connection has been established.

FIG. 4 may represent some of those possible additional features. For example, as shown, display 210 may partition the UI into four regions: region 210; region 220; region 230; and region 240. The top-most region, region 210, depicts a video camera symbol. If a user were to select region 210, mobile computing device 200 may initiate a data exchange with the other mobile computing device. (For example, if display 205 comprises a presence-sensitive display, the user may select region 210 by touching a portion of display 205 that corresponds with region 210. In particular, the portion of display 205 may correspond with an area of the UI associated with the video camera symbol.) In one example, if a user selects region 210, the mobile computing devices may begin a video call.

If a user were to select region 220, mobile computing device 200 may display a list of contacts that a user may select. Upon selection of one or more of the contacts, mobile computing device 200 may initiate an application data transfer sending the selected contacts to the other mobile computing device. If a user were to select region 230, mobile computing device 200 may initiate an application data transfer sending the selected location of mobile computing device 200 to the other mobile computing device. If a user were to select region 240, mobile computing device 200 may display a list of pictures that a user may select. Upon selection of one or more of the pictures, mobile computing device 200 may initiate an application data transfer sending the selected pictures to the other mobile computing device. The examples described with respect to FIG. 3 should be understood to be non-limiting. Mobile computing device 200 may display other data transfer features with respect to other types of application data.

In accordance with techniques of the present disclosure, mobile computing device may transfer some or all of the selected application data after a phone call between mobile computing device 200 and a second mobile computing device has terminated. For example, a user may select one or more of the regions of mobile computing device 200 and select to send application data to a second mobile computing device while the mobile computing devices are engaged in a phone call. In some examples, mobile computing device 200 may not initiate the transfer of the selected application data until after the phone call between the mobile computing devices has ended. In other examples, mobile computing device 200 may initiate the transfer of application data during the phone call, but may continue the transfer after the phone call has terminated. In still other examples, the data connection between mobile computing device 200 and the other mobile computing device may persist after the phone call between the two devices has terminated. In such examples, a user may select one of the regions shown in FIG. 4 and select application data to transfer after the phone call has ended. Accordingly, mobile computing device 200 may initiate and transfer the application data entirely after the phone call has ended.

According to at least one example, when a user selects region 220 and one or more contacts via UI device 148. UI device 148 may be in communication with UI module 164, and UI module 164 may receive the selection inputs. UI module 164 may send the received input selections to one or more other devices or modules of mobile computing device 200, for example via communications channels 150. Data exchange module 164 may receive the input selections from UI module 164 via communications channels 150. Data exchange module 166 may then retrieve the selected contacts from storage devices 160 and application data 192. In some examples, data exchange module 166 may communicate with application modules 180A-180N, and application modules 180A-180N may retrieve the selected contacts from application data 192 and then send the retrieved contacts to data exchange module 166. Finally, data exchange module 166 may then send the contacts to communication units 144 for communication with an external computing device, such as mobile computing device 4.

Figure 5:
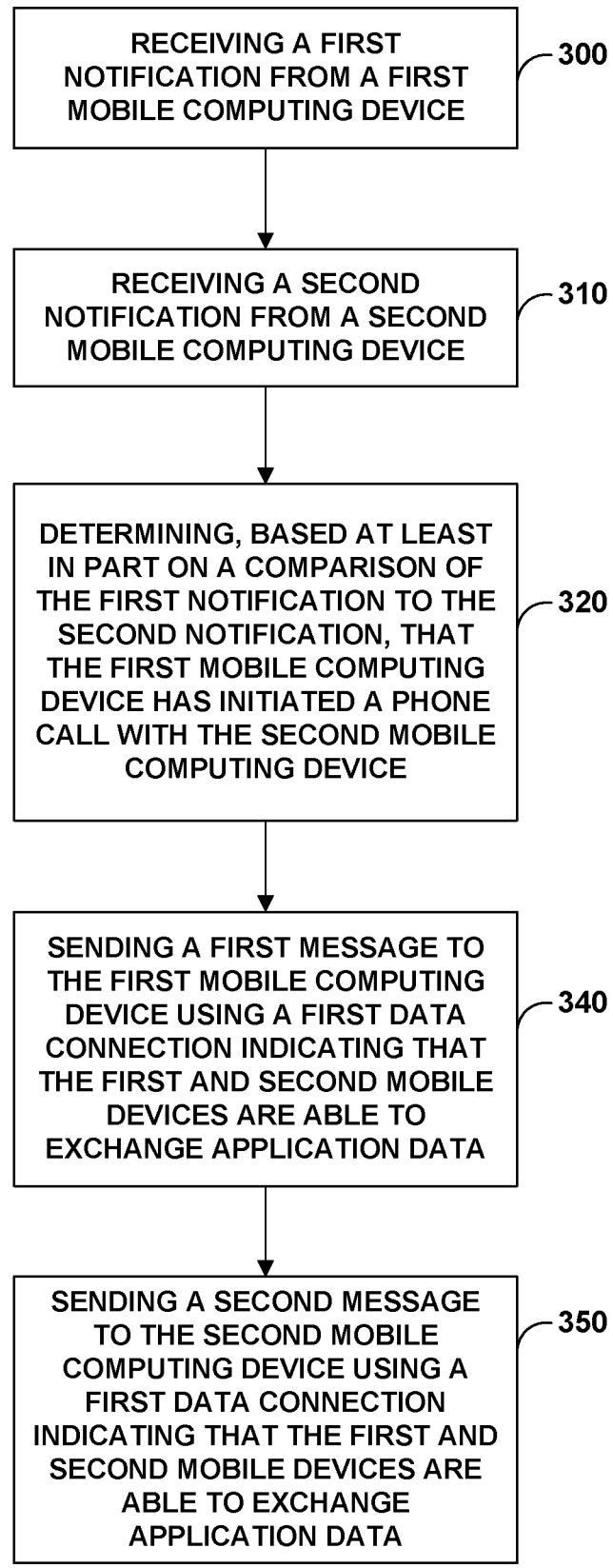
FIG. 5 is a flow chart illustrating an example operation of the one or more computing devices, according to one or more techniques of the present disclosure.

FIG. 5 is a flow chart illustrating an example operation of one or more computing devices, according to one or more techniques of the present disclosure. For purposes of illustration only, the example operations are described below within the context of computing devices 6 and mobile computing devices 2, as shown in FIGS. 1, 2, and 3.

In the example of FIG. 5, one or more computing devices 6 may receive a first notification from a first mobile computing device (e.g., mobile computing device 2) (300). Computing devices 6 may further receive a second notification from a second mobile computing device (e.g., mobile computing device 4) (310). After receiving the first and second notifications, computing devices 6 may compare the first and second notifications and, based on this comparison, determine that the first mobile computing device has initiated a phone call with the second mobile computing device (320). For example, computing devices 6 may determine that the first and second notifications match and, based on this determination, may determine that the first and second mobile computing devices are engaged in a phone call.

After determining that the first mobile computing device has initiated a phone call with the second mobile computing device, computing devices 6 may send a first message to the first mobile computing device using a first data connection (340). The message may indicate that the first and second mobile computing devices are able to exchange data. Additionally, computing devices 6 may send a second message to the second mobile computing device using a second data connection (350). Accordingly, the message may indicate that the first and second mobile computing devices are able to exchange data.

According to techniques of the present disclosure, in some examples, after determining that the first mobile computing device has initiated a phone call with the second mobile computing device, computing devices 6 may automatically establish a first data connection between computing devices 6 and the first mobile computing device and a second data connection between computing devices 6 and the second mobile computing device. In some examples, computing devices 6 may automatically establish the connection before sending the first and second messages. In other examples, computing devices 6 may direct the first and second mobile computing devices to establish one or more data connections. For example, computing devices 6 may direct the first and second mobile computing devices to establish a data connection between the two mobile computing devices. In other examples, computing devices 6 may direct the first mobile computing device to establish a first data connection between the first mobile computing device and computing devices 6 and the second mobile computing device to establish a second data connection between the second mobile computing device and computing devices 6. In some examples, computing devices 6 may automatically establish the first and second data connections or instruct the first and second mobile computing devices to automatically establish the one or more data connections.

According to techniques of the present disclosure, in some examples, after determining that the first mobile computing device has initiated a phone call with the second mobile computing device and sending first and second messages to the first and second mobile computing devices, respectively, computing devices 6 may further receive application data from a first one of the first and second mobile computing devices. Computing devices 6 may then send the application data to the second one of the first and second mobile computing devices.

According to techniques of the present disclosure, in some examples, after determining that the first mobile computing device has initiated the phone call with the second mobile computing device, computing devices 6 may receive a command from a first one of the first and second mobile computing devices. In some examples, the command instructs computing devices 6 to provide application data stored by computing devices 6 to a second, different one of the first and second computing devices. Computing devices 6 may further retrieve stored application data and send the retrieved application data to the second one of the first and second mobile computing devices.

According to techniques of the present disclosure, in some examples, mobile computing devices 2 and 4 are each configured to initiate and receive phone calls via a first network, such as network 10, and computing devices 6 is configured to send and receive application data, including the first and second messages and the first and second notifications, via a second network that is distinct from the first network, such as network 12.

According to techniques of the present disclosure, in some examples, prior to sending the first and second messages, computing devices 6 may perform one or more gateway checks. One example gateway check comprises determining whether at least one of the first mobile computing device and the second mobile computing device has previously initiated a threshold number of phone calls to other mobile computing device within a predetermined time period. Another example gateway check comprises determining whether one of the first mobile computing device or the second mobile computing device is associated with a block list of the respective other first or second mobile computing device, wherein the block list comprises a list of mobile computing device identifiers, and wherein the at least one computing device refrains from establishing a data connection with any mobile computing device whose identifier is included in the block list.

According to techniques of the present disclosure, in some examples, the first notification comprises a first hashed identifier, and the second notification comprises a second hashed identifier. In such examples, computing devices 6 may compare the first and second hashed identifiers and, in response to determining that the first and second hashed identifiers match, sending, by the at least one computing device, the first and second messages to the respective first and second mobile computing devices.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may include one or more computer-readable storage media.

A computer-readable storage medium comprises a non-transitory storage medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed:

1. A method comprising:
accepting or initiating, by a first mobile computing device, a non-video voice call with a second mobile computing device;
outputting, by the first mobile computing device and for display at a display connected to the first mobile computing device, an indication of one or more types of application data that may be exchanged with the second mobile computing device, the indication of the one or more types of application data including an option for initiating a video call with the second mobile computing device;
receiving, by the first mobile computing device, an indication of user input selecting the option to initiate the video call; and
responsive to receiving the indication of the user input:
terminating the non-video voice call between the first mobile computing device and the second mobile computing device; and
exchanging, by the first mobile computing device and with the second mobile computing device, application data to support the video call, wherein at least a portion of the application data to support the video call is exchanged after the non-video voice call between the first mobile computing device and the second mobile computing device has terminated.

2. The method of claim 1, wherein exchanging the application data comprises exchanging the application data directly between the first mobile computing device and the second mobile computing device.

3. The method of claim 1, wherein exchanging the application data comprises exchanging the application data via at least one computing device that is different than the first mobile computing device and the second mobile computing device.

4. The method of claim 1, wherein outputting the indication comprises outputting the indication after initiating, by the first mobile computing device, the non-video voice call with the second mobile computing device.

5. The method of claim 1, wherein outputting the indication comprises outputting the indication after accepting, by the first mobile computing device, the non-video voice call from the second mobile computing device.

6. The method of claim 1, wherein outputting the indication comprises outputting the indication in response to establishing, by the first mobile computing device, the non-video voice call from the second mobile computing device.

7. A mobile computing device comprising:
one or more communication units;
one or more processors; and
one or more modules operable by the one or more processors to:
accept or initiate a non-video voice call with another mobile computing device;
output, for display at a display connected to the mobile computing device, an indication of one or more types of application data that may be exchanged with the other mobile computing device, the indication of the one or more types of application data including an option for initiating a video call with the other mobile computing device;
receive an indication of user input selecting the option to initiate the video call; and
after receiving the indication of the user input:
terminate the non-video voice call between the mobile computing device and the other mobile computing device; and
exchange, with the other mobile computing device, application data to support the video call, wherein at least a portion of the application data to support the video call is exchanged after the non-video voice call between the mobile computing device and the other mobile computing device has terminated.

8. The mobile computing device of claim 7, wherein, to exchange the application data, the one or more processors are configured to exchange the application data directly between the mobile computing device and the other mobile computing device.

9. The mobile computing device of claim 7, wherein, to exchange the application data, the one or more processors are configured to exchange the application data via at least one computing device that is different than the mobile computing device and the other mobile computing device.

10. The mobile computing device of claim 7, wherein, to output the indication, the one or more processors are configured to output the indication after initiating, by the mobile computing device, the non-video voice call with the other mobile computing device.

11. The mobile computing device of claim 7, wherein, to output the indication, the one or more processors are configured to output the indication after accepting, by the mobile computing device, the non-video voice call from the other mobile computing device.

12. The mobile computing device of claim 7, wherein, to output the indication, the one or more processors are configured to output the indication in response to establishing, by the mobile computing device, the non-video voice call from the other mobile computing device.

13. A non-transitory computer-readable storage medium comprising instructions that, when executed, cause one or more processors of a mobile computing device to:
  accept or initiate a non-video voice call with another mobile computing device;
  output, for display at a display connected to the mobile computing device, an indication of one or more types of application data that may be exchanged with the other mobile computing device, the indication of the one or more types of application data including an option for initiating a video call with the other mobile computing device;
  receive an indication of user input selecting the option to initiate the video call; and
  after receiving the indication of the user input:
    terminate the non-video voice call between the mobile computing device and the other mobile computing device; and
    exchange, with the other mobile computing device, application data to support the video call, wherein at least a portion of the application data to support the video call is exchanged after the non-video voice call between the mobile computing device and the other mobile computing device has terminated.

14. The non-transitory computer-readable storage medium of claim 13, wherein the instructions that cause the one or more processors to exchange the application data comprise instructions that cause the one or more processors to exchange the application data directly between the mobile computing device and the other mobile computing device.

15. The non-transitory computer-readable storage medium of claim 13, wherein the instructions that cause the one or more processors to output the indication comprise instructions that cause the one or more processors to output the indication after initiating, by the mobile computing device, the non-video voice call with the other mobile computing device.

16. The non-transitory computer-readable storage medium of claim 13, wherein the instructions that cause the one or more processors to output the indication comprise instructions that cause the one or more processors to output the indication after accepting, by the mobile computing device, the non-video voice call from the other mobile computing device.

17. The non-transitory computer-readable storage medium of claim 13, wherein the instructions that cause the one or more processors to output the indication comprise instructions that cause the one or more processors to output the indication in response to establishing, by the mobile computing device, the non-video voice call from the other mobile computing device.

* * * * *